United States Patent [19]

Krappitz et al.

[11] Patent Number: 4,517,829

[45] Date of Patent: May 21, 1985

[54] PNEUMATIC SEALING ARRANGEMENT

[75] Inventors: Heinz Krappitz, Reinbek; Hans-Peter Carstensen, Schenefeld; Friedrich Weinhold, Norderstedt, all of Fed. Rep. of Germany

[73] Assignee: B.A.T. Cigaretten-Fabriken GmbH, Hamburg, Fed. Rep. of Germany

[21] Appl. No.: 469,895

[22] Filed: Feb. 25, 1983

[51] Int. Cl.³ .................... G01M 3/00; B07C 5/00
[52] U.S. Cl. ........................... 73/49.8; 209/537
[58] Field of Search ............ 209/535, 537, 591; 73/41, 45, 45.1, 45.2, 49.8; 131/904, 907

[56] References Cited

U.S. PATENT DOCUMENTS

| 2,951,364 | 9/1960 | Sherrill | 209/537 X |
| 3,034,645 | 5/1962 | Groppe | 209/537 X |
| 3,386,281 | 6/1968 | Menge et al. | 73/49.8 X |
| 3,677,068 | 7/1972 | Schmermund | 73/41 |
| 3,769,832 | 11/1973 | Baier | 73/49.8 X |
| 4,429,567 | 2/1984 | Koch et al. | 73/49.8 |

FOREIGN PATENT DOCUMENTS

| 2150186 | 4/1973 | Fed. Rep. of Germany . |
| 2324055 | 11/1974 | Fed. Rep. of Germany . |
| 2422276 | 11/1974 | Fed. Rep. of Germany . |
| 2653735 | 6/1978 | Fed. Rep. of Germany . |
| 3140812 | 3/1982 | Fed. Rep. of Germany . |
| 3110550 | 9/1982 | Fed. Rep. of Germany . |
| 1217203 | 12/1970 | United Kingdom . |

Primary Examiner—Robert B. Reeves
Assistant Examiner—Edward M. Wacyra
Attorney, Agent, or Firm—Roylance, Abrams, Berdo & Goodman

[57] ABSTRACT

A sealing arrangement for the temporary attachment of a testing air line to the end of a cigarette has an essentially hollow cylindrical sealing body with flanges projecting radially to the inside and outside of the sealing end. The other end of the sealing body is held firmly. The outside edge of the outwardly projecting flange of the sealing body is inserted into a coaxial annular groove of the bore of a supporting body movable axially toward the held end to elastically deform the sealing body, permitting insertion or removal of the cigarette. In its undeformed state the sealing body seals against the cigarette end.

24 Claims, 8 Drawing Figures

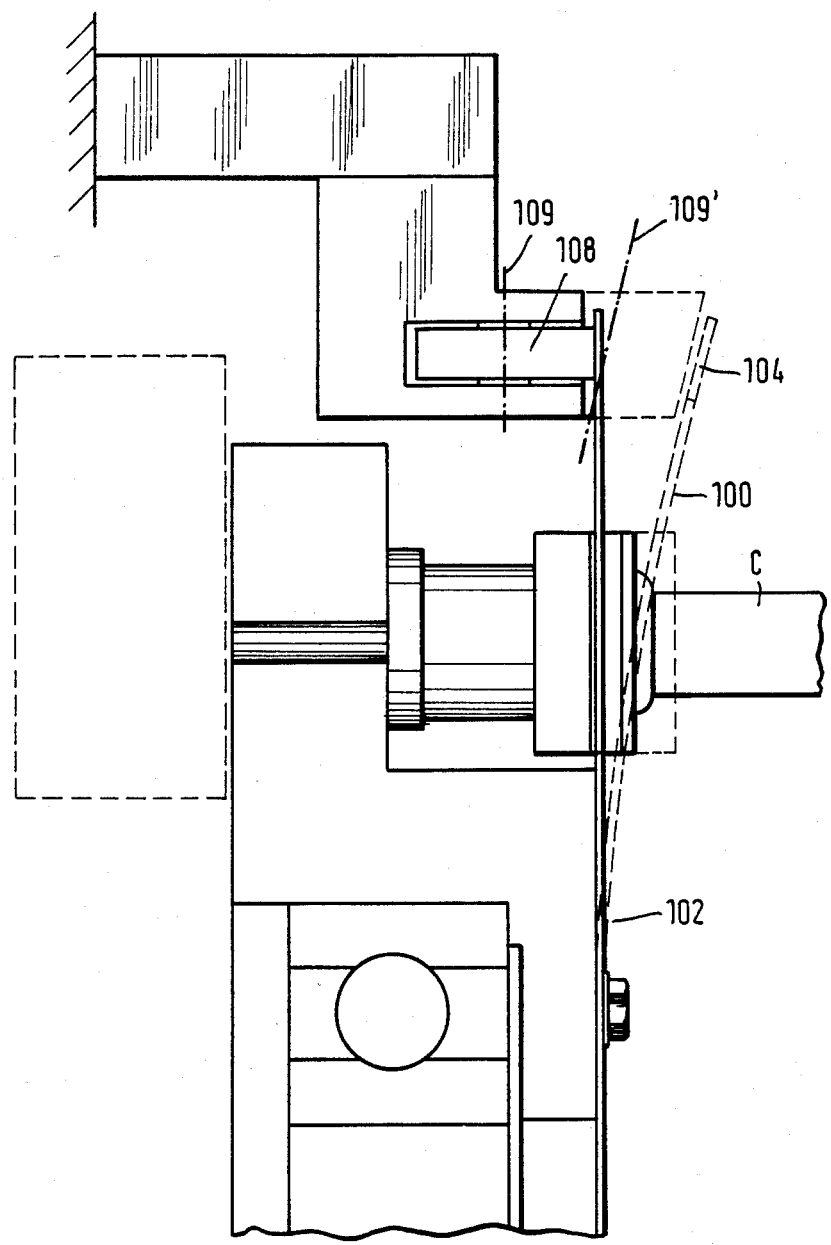

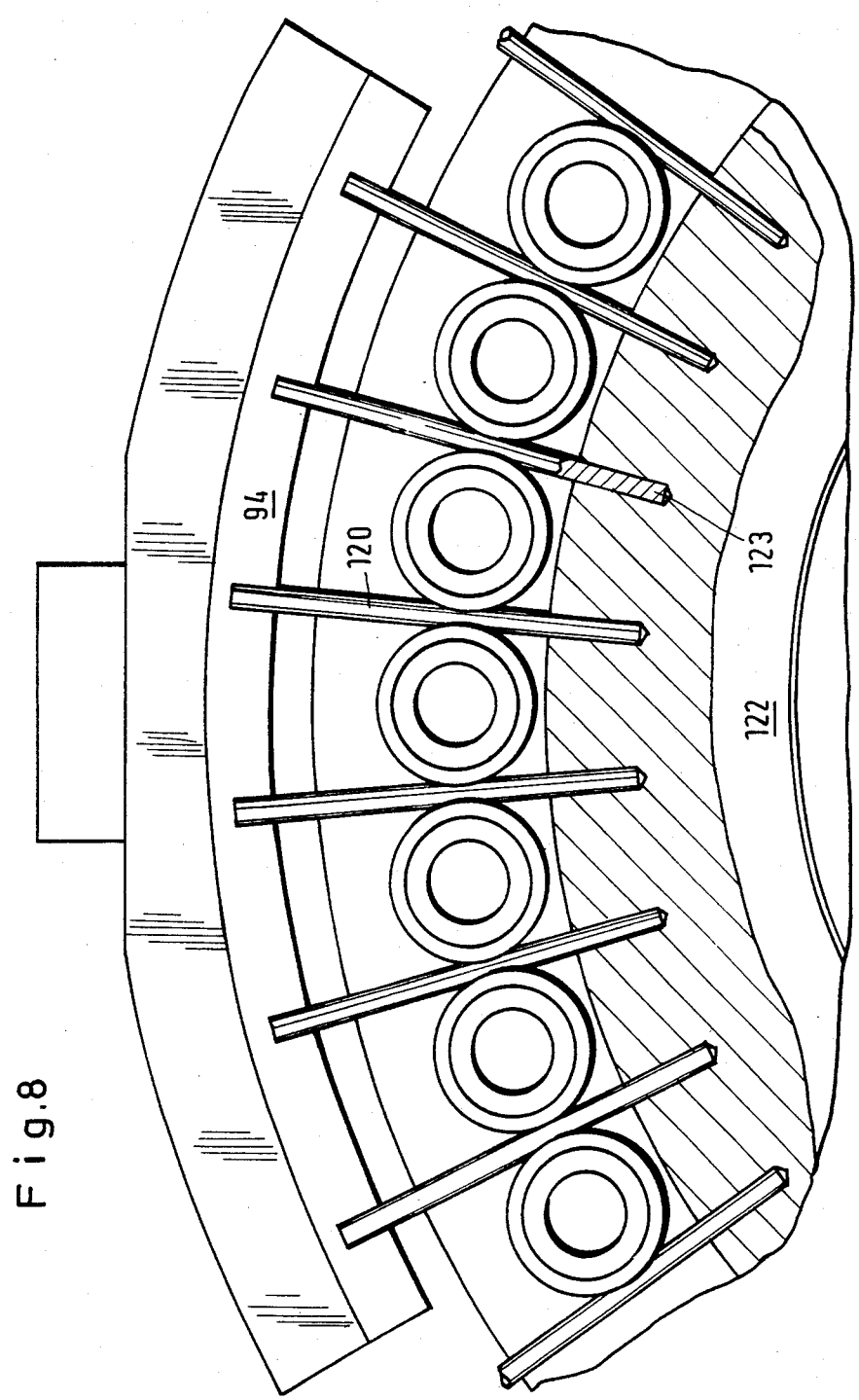

PNEUMATIC SEALING ARRANGEMENT

BACKGROUND OF THE INVENTION

When using automatic production equipment which operates at a very high speed to produce articles at a very high rate, especially in the case of production of cigarettes, there are special requirements and burdens on quality checking. Each individual article which has been produced must be reliably checked and, if a flaw is detected, the flawed article must be separated out. In practice, pneumatic testing processes are used for this purpose and some of these are described in German OS No. 2,324,055; OS No. 2,653,735; and AS No. 2,422,276.

When using pneumatic inspection procedures, the end of the cigarette must be pneumatically sealed to a tube for delivering testing air for forming a testing signal, and the seal presents a special problem. For such testing processes, it is necessary to seal the end of a cigarette during a very small time interval without damaging the end. At the same time, the sealing arrangement which connects and delivers the testing air must be placed against the cigarette in such a way that the feed line of the testing air lies precisely coaxially in relation to the cigarette.

Known testing arrangements use so-called testing tubes which involve essentially cylindrical or slightly conical sealing bodies with an axial bore and with a connecting or sealing surface at the end toward the cigarette which is generally in the shape of an axially opening hemispherical cup. The radius of the open end of this surface is larger than that of the cigarette to be tested so that a seal is formed primarily because of the fact that the cigarette end is slightly compressed in a tapered shape while the edges of the cup extend axially beyond the terminal surface of the cigarette and without, however, contacting the outside wall of the cigarette. Other arrangements are equipped with hemispherical cup-like members which are, nevertheless, placed onto the cigarette ends in the same manner as the tubes.

Practical experience with such sealing arrangements as, for example, illustrated in German OS No. 2,324,055, have shown from evidence at the contact surfaces that the contact between the sealing body and the cigarette deviates from concentric coaxial contact because of otherwise imperceptible imprecisions. It also appears that the eccentricity in any one tube remains the same but it differs from one tube to another. Apparently purely by accident, some tubes also show concentric or nearly concentric contact. These experiences confirm what has also been found by additional testing of the cigarettes, namely, that because of sealing faults and because of eccentric feeding of the testing air, the test results include many mistakes resulting in the rejection of cigarettes without flaws despite the high expenditure for these mechanical devices.

BRIEF DESCRIPTION OF THE INVENTION

Accordingly, an object of the present invention is to provide an improved sealing arrangement of the general type described above which permits even, coaxial and perfectly sealed connection of cigarettes, or of similar objects, to a testing air line without visibly impairing the end of the object which is to be tested.

Briefly described, the invention includes an improved sealing apparatus for temporarily sealingly engaging the end of a cylindrical body so that air under pressure can be applied to the cylindrical body for testing thereof, the apparatus being of the type including a rotationally symmetrical sealing body of an elastomeric material for engaging the cylindrical body and support means for supporting and moving the sealing body into engagement with the end of the cylindrical body, the improvement wherein said sealing body comprises a hollow cylindrical portion having a sealing end and a fixed end; and radially inwardly and outwardly extending flanges at said sealing end in substantially the same plane; and said support means includes means for holding said fixed end of said cylindrical portion; axially movable gripping means for engaging said outwardly extending flange of said sealing body; and means for axially moving said gripping means so that said outwardly extending flange moves toward the plane containing said fixed end to elastically deform and enlarge said inwardly extending flange to permit insertion of the end of said cylindrical body and away from said plane to return said outwardly extending flange to its original position in which the inner distal edge of said inwardly extending flange sealingly engages said cylindrical body.

The sealing arrangement in accordance with the invention permits the end of a longitudinal cylindrical body, expecially a cigarette, to remain perfectly sealed for a very short time interval and permits connection of the end by way of the seal to a test air line and to always reliably connect it in a precisely concentric and coaxial relationship. Whereas with previous devices a spherically shaped cup was placed against the cigarette or similar object and the terminal surface was sometimes compressed at the same time, the cylindrical end of the cigarette at the jacket surface is enclosed by the sealing body in accordance with the invention so that the terminal surface is not impaired in any way. Moreover, this results automatically in coaxial alignment of the cigarette with the test air feed line.

The sealing arrangement in accordance with the invention can also be used, in the same manner as will be described in connection with cigarettes, for other similar articles such as, for example, the testing of cigarillos or cigars, and also for testing cylindrical filter bodies and other articles.

In order that the manner in which the foregoing and other objects are attained in accordance with the invention can be understood in detail, particularly advantageous embodiments thereof will be described with reference to the accompanying drawings, which form a part of this specification, and wherein:

FIGS. 6 and 7 are views similar to FIGS. 3 and 4 of a further embodiment of a mechanical drive for the sealing arrangement in accordance with the invention; and FIG. 8 is a view similar to FIG. 3 of yet another embodiment of an apparatus in accordance with the invention.

DETAILED DESCRIPTION OF THE DRAWINGS

Figure 1:
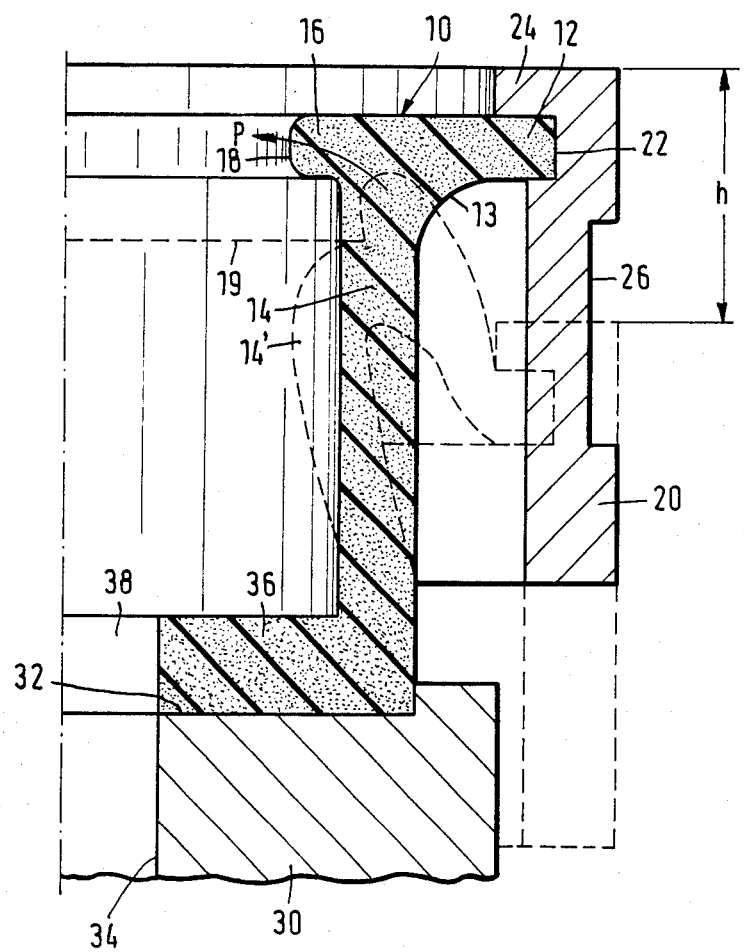
FIG. 1 is a partial side elevation, in axial section, showing one-half of a sealing, holding and supporting body with the sealing position shown in solid lines and the open position in dashed lines.

Referring first to FIG. 1, the improved sealing arrangement includes a sealing body 10 which is generally in the form of a hollow cylinder and is made from an elastomeric material such as rubber or the like preferably having a Shore hardness in the order of 40. The sealing body 10 has an end which is provided to accomplish the sealing connection which has a radially outwardly extending flange 12 and a radially inwardly projecting flange 16 which lies in the same plane as flange 12. The flange 16 is rounded at 18 at its inner edge in the embodiment of FIG. 1. Sealing contact with a cigarette extending into the axial opening is accomplished by surface elements comprising the innermost annular line on the rounded surface 18 (i.e., in a geographical sense, the shortest latitudinal line) and the surface areas adjoining thereto in an axial direction. The radial dimension of flange 12 is considerably greater than that of flange 16 and the outer portion of flange 12 merges smoothly in an arcuate curve into the hollow cylinder 14 which extends axially therefrom, parts 14, 12 and 16 being unitarily formed as one piece.

The outer periphery of flange part 12 engages and closely fits in an annular groove 22 which tightly fits the flange and is filled thereby. Groove 22 is formed in the upper periphery of the cylindrical bore of an outside mounting body 20 in such a way that the annular groove is coaxial with respect to sealing body 10. The annular groove is closed in the annular direction by an annular flange 24 which projects radially inwardly and lies over the axial end surface of flange part 12. The ratios of sizes are chosen such that a friction of such magnitude develops between the surfaces of flange part 12 and annular flange 24 that the sealing body 10 is not pulled out of annular groove 24 as the result of deformation of the elastic body.

The outside periphery of mounting body 20 is provided with recesses 26 with which an operating apparatus can engage.

The cylindrical portion 14 of hollow cylindrical body 10 is formed with a bottom 36, in one piece, at the end facing away from flange parts 12, 16, the bottom end having a central bore 38. Bottom 36 is seated in a recess 32 of a supporting body 30 in such a way that the bore 38 lies in alignment with a bore 34 in the supporting body, bores 34 and 38 having the same diameter.

In order to open the sealing arrangement, the seal which is supported axially by the supporting body 30 is deformed in such a way that the flange 16 projecting toward the inside is tilted, along with the inside sealing edge 18, to the outside and is stretched at the same time as illustrated by the dashed lines in FIG. 1. For this purpose, the mounting body 20, which firmly holds the periphery of flange 12, is moved toward mounting body 30, downwardly in FIG. 1. At the same time, the cylindrical wall 14 is also deformed, as shown at 14' in FIG. 1, and projects inwardly. For the opening of the seal, the mounting body is pushed downwardly by a distance h such that the upper flange edge 24 lies significantly below the inner flange part 16 projecting upwardly and tilting outwardly by about 60° to 80°. As a result of the axial shifting of flange 12 which is held in annular groove 22, and because of the inward bulge 14', the inside sealing line 18 is moved back so far that, in this opened position, the sealing arrangement can be axially moved to the end of a cigarette which can project approximately up to the edge 19 which is shown also in dashed lines in FIG. 1, but at least far enough so that in the closed state of the sealing arrangement the cigarette end is still sufficiently enclosed.

After that, the mounting body 20 is axially moved upwardly, referring again to the direction of FIG. 1, in such a way that the inside flange 16 and its sealing line 18 moves in the general direction illustrated by arrow P and thus encloses the end of the cigarette which extends, at most, up to line 19. The cigarette is thus connected in a sealed manner to channel 34 which can be viewed as the test air channel. After proper testing, the mounting body 20 is again moved downwardly so that the seal is released and the sealing arrangement can be moved away from the cigarette end.

Figure 2:
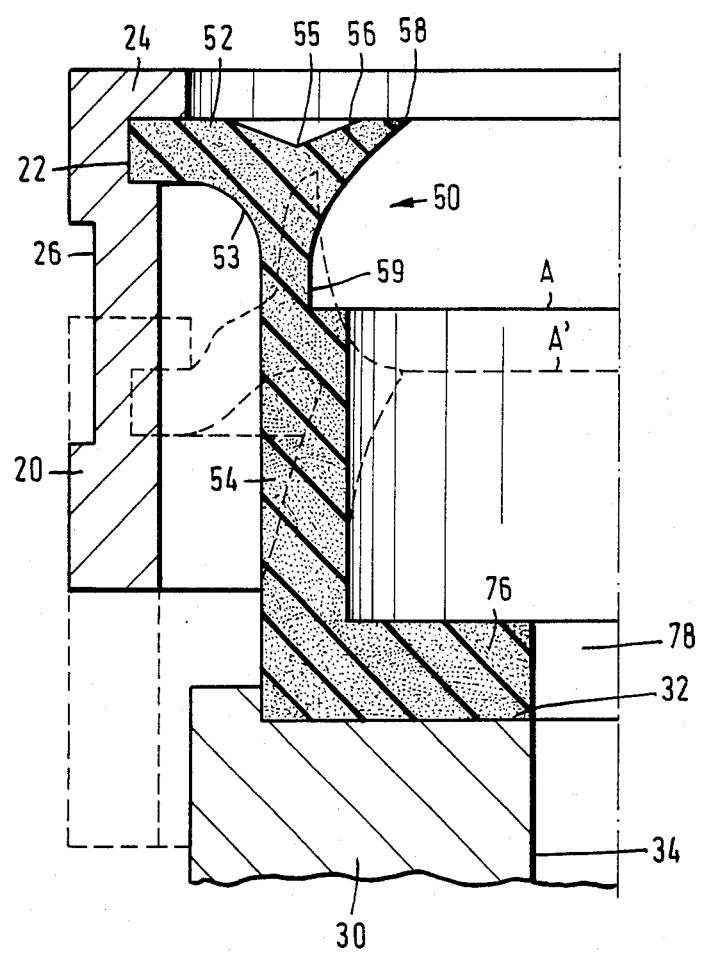
FIG. 2 is a view similar to FIG. 1 of a further embodiment of an apparatus in accordance with the invention.

A modified sealing body 50 is shown in FIG. 2 wherein the parts corresponding to the sealing body in FIG. 1 are identified by reference numerals with the value 40 added thereto. Those parts which are identical to those in FIG. 1 are similarly identified and will not be again described. The sealing body 50 has a flange part 56 projecting radially inwardly and developed in the form of a sealing lip which tapers outwardly and inwardly to an upper edge 58. Between the flange part 52 and flange part 56 a small annular groove 55 is formed in the front surface, as a result of which the sealing lip 56 is more easily movable. Furthermore, the hollow cylindrical sealing body 50 in the upper part of the cylindrical wall 54, referring to the directions shown in FIG. 2, can be formed with a recess 59 in such a way that the cylindrical wall 54 is decreased in thickness in the upper section just below the branching off of flange parts 52 and 56. Thus, the mobility of the sealing body for opening and closing is increased still further. Moreover, the section A which, after opening, forms the edge A' projecting radially inwardly can serve as a limiting surface whenever one operates with a two-step movement instead of the simple movement which has been described in connection with FIG. 1. In this case, the arrangement including the parts 50, 20 and 30, is moved axially back and forth with the sealing body 50 and the mounting body 20 in the position indicated by dashed lines together with the supporting body 30 in order to make possible an engagement of the body that is to be sealed up to, at most, into the area of edges A or A'. The inside edge 58 projects radially inwardly, in the released state, beyond the inside wall of cylindrical sleeve 54. In the sealing position, the edge 58 and the wall section of lip 56 adjoining it on the inside move into sealing engagement with the cylindrical body, e.g., the cigarette, the end of which is to be sealed off or the end of which is to be connected sealingly with a test air line.

FIGS. 1 and 2 clearly show the essential difference as compared with previously used techniques wherein one of the cup-shaped elastic seals is placed against the terminal end of the body that is to be sealed such that, unavoidably, the edge which forms the line of intersection between the jacket surface and the terminal surface is more or less impaired or damaged and it is not possible to compensate for maladjustments or imprecisions. On the contrary, the seal produced with the sealing bodies 10 or 50 in accordance with the invention by enclosing the jacket surface directly adjacent the line of intersection between the jacket surface and the terminal surface automatically guarantees centering and perfect, reliable and uniform sealing.

Figure 3:
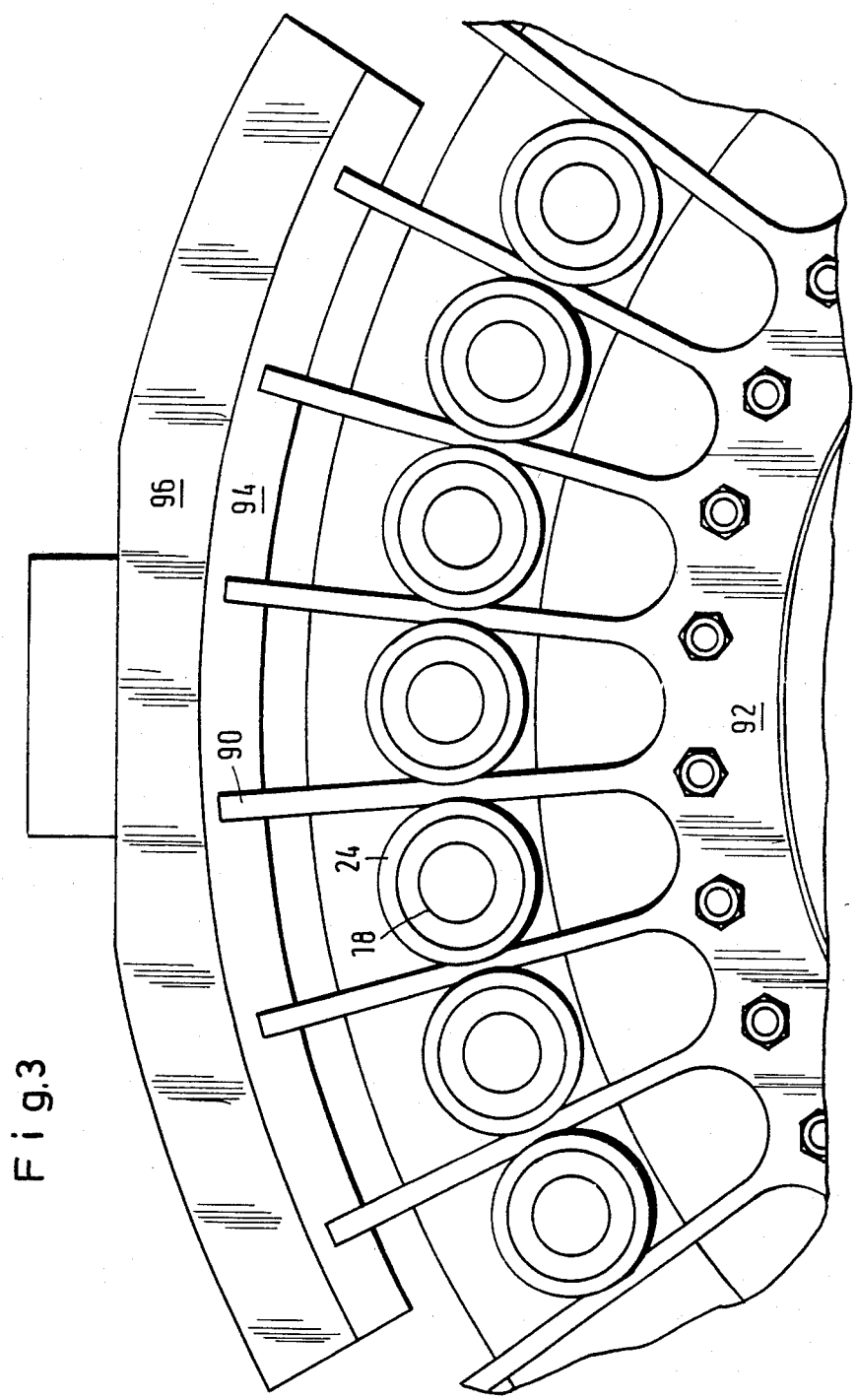
FIG. 3 is a fragmentary axial or end view of an apparatus for the mechanical drive and control of a sealing arrangement in accordance with the invention.
Figure 4:
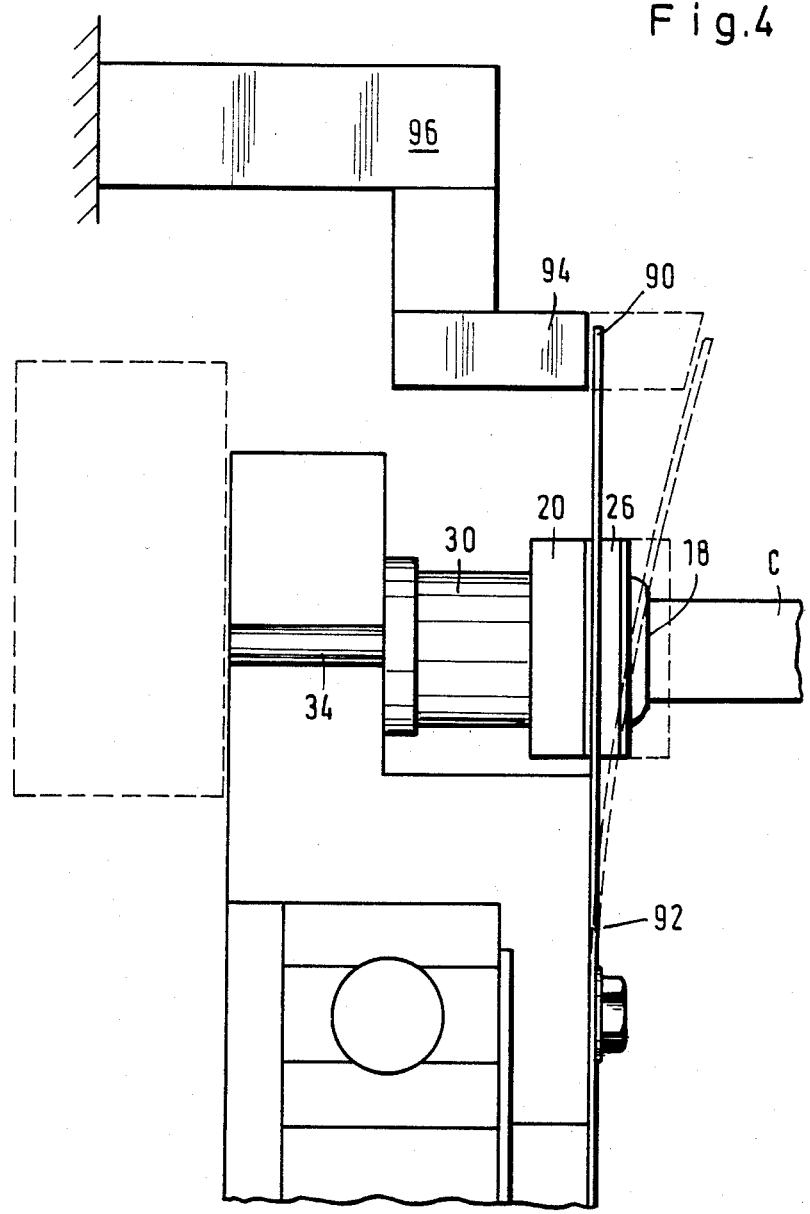
FIG. 4 is a schematic side elevation of a portion of the apparatus of FIG. 3.
Figure 5:
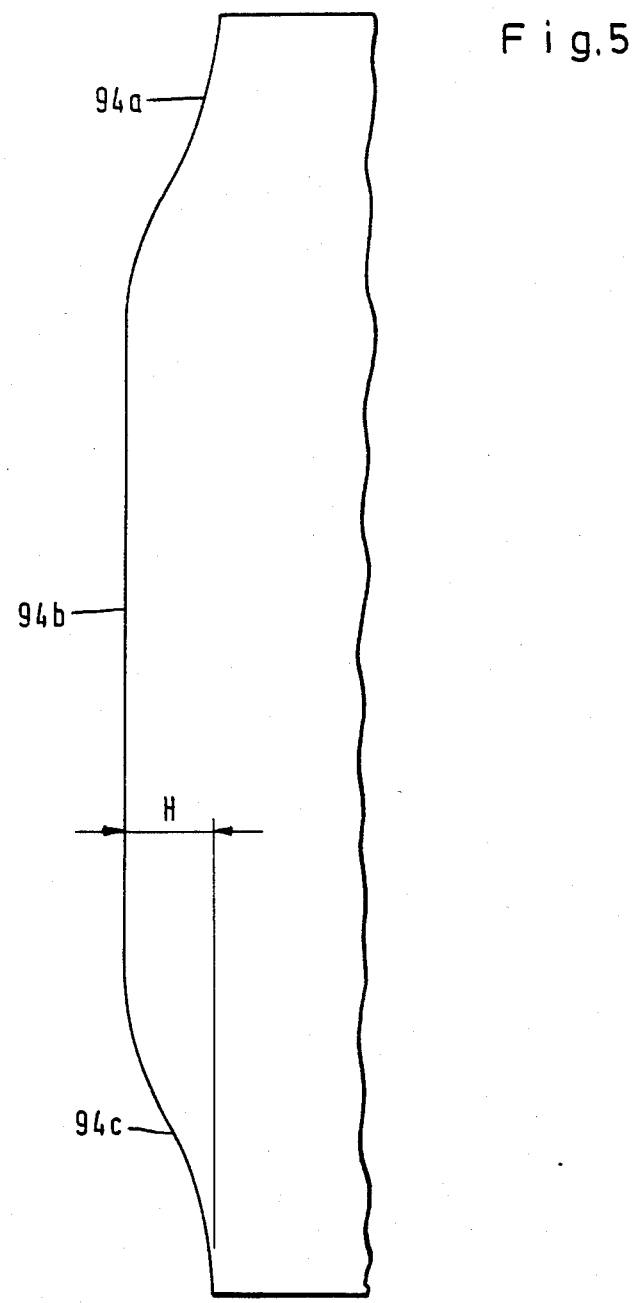
FIG. 5 shows a planar, "unrolled" development of a control cam used in the apparatus of FIGS. 3 and 4.

FIGS. 3–5 show an apparatus in which the sealing arrangements formed in a cylindrical array, like a drum, can be operated in the customary manner. The reference numerals of FIG. 1 are used for corresponding parts. The sealing arrangement consisting of parts 10, 20 and 30 is held in its distorted state, in the position shown in dashed lines in FIG. 1, just before operation, that is to say, just before it is applied to the articles to be tested, and in order to affect a sealing connection, it is moved into the position shown in solid lines in FIG. 1 for which purpose the mounting body is axially moved by the distance H. For this purpose, each mounting body 20 is disposed between the prongs 90 of a fork wherein, as shown in FIG. 3, the arrangement is preferably so compact that the prongs 90 are developed as the spring spokes of a disc 92. The spokes engage with recesses 26. The distal ends of the spokes glide over a cam surface 94 which ends project, in the actual testing drum on which the cylindrical bodies to be tested project as illustrated by cigarette C shown in FIG. 4.

FIG. 5 shows an unrolled or unwound development of a cam surface 94 which is attached to a support 96. The height H of the cam between the cam sections 94a in front of, or 94c behind, the test region and the cam area 94b across the length of which the sealing connection takes place corresponds to the stroke h, FIG. 1. A machine, such as that shown in German OS No. 2,324,055 can be equipped with an arrangement in accordance with the invention without any difficulty.

Figure 6:
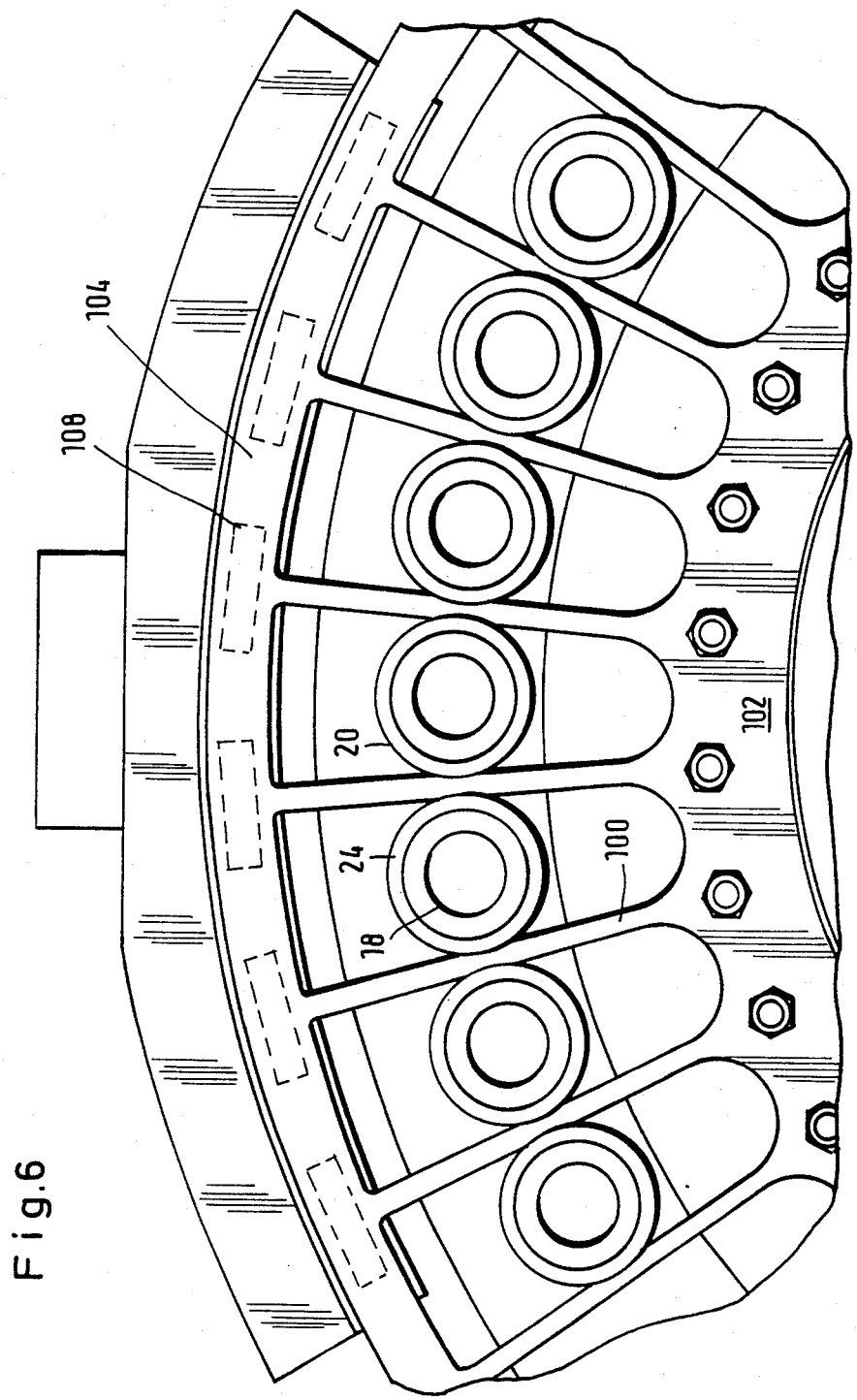

FIGS. 6 and 7 show a modified form of an apparatus for the operation and control of the sealing arrangement. The mounting bodies 20 are disposed between the radially extending spring spokes 100 of a spring disc 102. The outside distal ends of the spring spokes are connected by a ribbon 104 which is unitarily formed with the spokes of the spring disc in such a way that the parts 102, 100 and 104 are integral. Additional ball bearings 108 are disposed in the cam path at uniform distances in such a way that their outside peripheries project somewhat from the front face of the cam surface. At the same time, the axes 109, 109' of the ball bearings 108 are always parallel with the slanting position of the annular ribbon 104. This arrangement improves the sequence of movements such that the transitions of the sealing arrangements from their open to their closed states and back again become more smooth and fluid.

Instead of the spring disc shown in FIGS. 3 and 6 it is also possible that the hub of the driving wheel 122 (FIG. 8) is provided with bores 123 into which spring bars 120, somewhat similar to knitting needles, are solidly inserted. The outside ends of these spring bars again move under the influence of a cam surface 24 and thus make possible the axial shifting of mounting bodies 20. In FIGS. 3–8, operating and control arrangements for the use of the sealing arrangement on so-called test drums are shown such that on their peripheries the longitudinal cylindrical articles that are to be tested are disposed in parallel with the axis of the entire apparatus. In the case of longitudinally cylindrical articles which are conveyed along a straight test distance, the articles at the same time lying with their axes at right angles to the direction of conveyance, the sealing arrangement can also be carried along in a straight line by way of a corresponding section. Furthermore, test arrangements are conceivable wherein the sealing arrangement consisting of parts 10, 20 and 30 is disposed essentially locally fixed so that only the mounting body 20 is moved back and forth axially and the test bodies are moved in cycles with a short tarry time past the testing arrangements. In each case, one operates with the basic principal which has been explained with reference to FIGS. 1 and 2. At the same time, the sealing body can be used either with or without the passage for test air.

While certain advantageous embodiments have been chosen to illustrate the invention, it will be understood by those skilled in the art that various changes and modifications can be made therein without departing from the scope of the invention as defined in the appended claims.

What is claimed is:

1. An improved sealing apparatus for temporarily sealingly engaging the end of a cylindrical body so that air under pressure can be applied to the cylindrical body for testing thereof, the apparatus being of the type including a rotationally symmetrical sealing body of an elastomeric material for engaging the cylindrical body and support means for supporting and moving the sealing body into engagement with the end of the cylindrical body, the improvement wherein said sealing body comprises
a hollow cylindrical portion having a sealing end and a fixed end; and
radially inwardly and outwardly extending flanges at said sealing end in substantially the same plane;
and said support means includes
means for holding said fixed end of said cylindrical portion;
axially movable gripping means for engaging said outwardly extending flange of said sealing body; and
means for axially moving said gripping means so that said outwardly extending flange moves toward the plane containing said fixed end to elastically deform and enlarge said inwardly extending flange to permit insertion of the end of said cylindrical body and away from said plane to return said outwardly extending flange to its original position in which the inner distal edge of said inwardly extending flange sealingly engages said cylindrical body.

2. An apparatus according to claim 1 wherein said gripping means includes a generally cylindrical body having an annular groove for receiving said outwardly extending flange of said sealing body and an inwardly extending flange overlying said outwardly extending flange.

3. An apparatus according to claim 2 wherein said outwardly extending flange on said sealing body merges smoothly along a curve into the outer surface of said hollow cylindrical portion.

4. An apparatus according to claim 3 wherein said inwardly extending flange of said sealing body is substantially equal in thickness but radially smaller than said outwardly extending flange of said sealing body.

5. An apparatus according to claim 4 wherein the axially inner corner of said inner distal edge of said inwardly extending flange is rounded.

6. An apparatus according to claim 2 wherein said means for axially moving said gripping means includes a plurality of spring forks engaging said gripping means.

7. An apparatus according to claim 6 wherein said means for axially moving further includes an axially varying cam surface on which said spring forks ride.

8. An apparatus according to claim 7 wherein said spring forks comprise radially extending spoke-like members.

9. An apparatus according to claim 8 wherein the inner ends of said forks are connected to a circular member and the outer ends thereof are connected to an annular, ribbon-like member.

10. An apparatus according to claim 1 wherein said inwardly extending flange of said sealing body is substantially equal in thickness but radially smaller than said outwardly extending flange of said sealing body.

11. An apparatus according to claim 1 wherein said inwardly extending flange tapers from said cylindrical portion to said distal edge.

12. An apparatus according to claim 11 and including means defining an annular recess in the inner wall of said cylindrical portion adjacent said inwardly extending flange.

13. An apparatus according to claim 11 and including means defining a shallow, generally V-shaped groove in the axially facing surface joining said inwardly and outwardly extending flanges.

14. An apparatus according to claim 11 wherein said means for axially moving said gripping means includes a plurality of spring forks engaging said gripping means.

15. An apparatus according to claim 14 wherein said means for axially moving further includes an axially varying cam surface on which said spring forks ride.

16. An apparatus according to claim 15 wherein said spring forks comprise radially extending spoke-like members.

17. An apparatus according to claim 16 wherein the inner ends of said forks are connected to a circular member and the outer ends thereof are connected to an annular, ribbon-like member.

18. An apparatus according to claim 1 wherein said means for holding said fixed end includes a fixed body and a generally circular recess in said fixed body for receiving said fixed end.

19. An apparatus according to claim 18 wherein the fixed end of said sealing body includes an axial throughbore and said fixed body includes an axial throughbore aligned with the bore in said sealing body.

20. An apparatus according to claim 1 wherein the fixed end of said sealing body includes an axial throughbore and said fixed body includes an axial throughbore aligned with the bore in said sealing body.

21. An apparatus according to claim 1 wherein said means for axially moving said gripping means includes a plurality of spring forks engaging said gripping means.

22. An apparatus according to claim 21 wherein said means for axially moving further includes an axially varying cam surface on which said spring forks ride.

23. An apparatus according to claim 22 wherein said spring forks comprise radially extending spoke-like members.

24. An apparatus according to claim 23 wherein the inner ends of said forks are connected to a circular member and the outer ends thereof are connected to an annular, ribbon-like member.

* * * * *